US010514473B2

(12) United States Patent
Naes (10) Patent No.: US 10,514,473 B2
(45) Date of Patent: Dec. 24, 2019

(54) SEABED COUPLING PLATE FOR AN OCEAN BOTTOM SEISMIC NODE

(71) Applicant: Seabed Geosolutions B.V., Leidschendam (NL)

(72) Inventor: Johan Fredrik Naes, Trondheim (NO)

(73) Assignee: Seabed Geosolutions B.V., Leidschendam (NL)

( * ) Notice: Subject to any disclaimer, the term of this patent is extended or adjusted under 35 U.S.C. 154(b) by 440 days.

(21) Appl. No.: 15/164,629

(22) Filed: May 25, 2016

(65) Prior Publication Data

US 2016/0349386 A1    Dec. 1, 2016

Related U.S. Application Data

(60) Provisional application No. 62/168,211, filed on May 29, 2015.

(51) Int. Cl.
*G01V 1/06* (2006.01)
*G01V 1/16* (2006.01)
*G01V 1/38* (2006.01)

(52) U.S. Cl.
CPC ............ *G01V 1/166* (2013.01); *G01V 1/3852* (2013.01); *G01V 2210/1427* (2013.01)

(58) Field of Classification Search
USPC ......................................................... 367/178
See application file for complete search history.

(56) References Cited

U.S. PATENT DOCUMENTS

| 2,166,916 | A |   | 7/1939  | Lombard |
| 3,478,297 | A | * | 11/1969 | Gimpel ................ H01R 13/523 |
|           |   |   |         | 439/205 |
| 4,692,906 | A |   | 9/1987  | Neeley |
| 4,912,817 | A |   | 4/1990  | Sandreid |
| 5,070,805 | A |   | 12/1991 | Plante |
| 5,189,642 | A |   | 2/1993  | Donoho et al. |

(Continued)

FOREIGN PATENT DOCUMENTS

| GB | 2492889 | | 1/2013 |
| WO | 2005074426 | A2 | 8/2005 |

(Continued)

OTHER PUBLICATIONS

Kum, "Seismometer K/MT 210", Umwelt- und Meerestechnik Kiel GmbH, www.kum-kiel.de.

(Continued)

*Primary Examiner* — James R Hulka
(74) *Attorney, Agent, or Firm* — Park, Vaughan, Fleming & Dowler LLP; Shane Nelson (57) ABSTRACT

Systems, methods, and apparatuses related to coupling an autonomous seismic node to the seabed. In one embodiment, the node may comprise a plurality of holes on a bottom surface of the node and a plurality of openings on one or more sides and/or surfaces of the node. The bottom surface may comprise a coupling plate that is coupled to the node and/or coupled to a housing or casing that substantially surrounds a pressure node housing. The node may be configured to route water vertically from the bottom holes through the side openings and/or upper holes to decrease the potential of cavitation and fluidization of the seismic sediment and increase the seismic coupling of the node to the seabed.

17 Claims, 4 Drawing Sheets

(56) References Cited

U.S. PATENT DOCUMENTS

| | | | |
|---|---|---|---|
| 6,024,344 | A | 2/2000 | Buckley et al. |
| 6,044,786 | A | 4/2000 | Dudley et al. |
| 6,288,972 | B1 | 9/2001 | Norris |
| 6,657,921 | B1 | 12/2003 | Ambs |
| 6,951,138 | B1 | 10/2005 | Jones |
| 6,997,731 | B1 * | 2/2006 | Wood ............... H01R 13/623 |
| | | | 439/314 |
| 7,092,315 | B2 | 8/2006 | Olivier |
| 7,195,505 | B1 * | 3/2007 | Becker ............. H01R 13/5219 |
| | | | 439/271 |
| 7,254,093 | B2 | 8/2007 | Ray et al. |
| 7,260,024 | B2 | 8/2007 | Goujon et al. |
| 7,286,442 | B2 | 10/2007 | Ray et al. |
| 7,310,287 | B2 | 12/2007 | Ray et al. |
| 7,324,406 | B2 | 1/2008 | Berg |
| 7,561,493 | B2 | 7/2009 | Ray et al. |
| 7,602,667 | B2 | 10/2009 | Thompson |
| 7,646,670 | B2 | 1/2010 | Maxwell et al. |
| 7,649,803 | B2 | 1/2010 | Ray et al. |
| 7,668,047 | B2 | 2/2010 | Ray et al. |
| 7,675,821 | B2 | 3/2010 | Berg et al. |
| 7,724,607 | B2 | 5/2010 | Ray et al. |
| 7,778,114 | B2 | 8/2010 | Goujon et al. |
| 7,804,737 | B2 | 9/2010 | Thompson |
| 7,883,292 | B2 | 2/2011 | Thompson et al. |
| 7,929,378 | B2 | 4/2011 | Gros |
| 7,933,165 | B2 | 4/2011 | Thompson et al. |
| 7,986,589 | B2 | 7/2011 | Ray et al. |
| 7,990,803 | B2 | 8/2011 | Ray et al. |
| 8,021,080 | B2 | 9/2011 | Frivik et al. |
| 8,050,140 | B2 | 11/2011 | Ray et al. |
| 8,087,848 | B2 | 1/2012 | Thompson et al. |
| 8,096,253 | B1 | 1/2012 | Ruffa |
| 8,149,647 | B2 | 4/2012 | Borgen et al. |
| 8,172,480 | B2 | 5/2012 | Thompson et al. |
| 8,226,328 | B2 | 7/2012 | Thompson et al. |
| 8,228,761 | B2 | 7/2012 | Ray et al. |
| 8,328,467 | B2 | 12/2012 | Thompson et al. |
| 8,427,900 | B2 | 4/2013 | Fleure et al. |
| 8,619,495 | B2 | 12/2013 | Thompson et al. |
| 8,675,446 | B2 | 3/2014 | Gateman et al. |
| 8,801,328 | B2 | 8/2014 | Thompson et al. |
| 8,864,416 | B2 | 10/2014 | Thompson et al. |
| 8,879,362 | B2 | 11/2014 | Ray et al. |
| 8,942,059 | B2 | 1/2015 | Furuhaug |
| 9,090,319 | B2 | 7/2015 | Brizard et al. |
| 9,170,344 | B2 | 10/2015 | Lindberg |
| 9,233,051 | B2 * | 1/2016 | Tufi ..................... A61J 1/035 |
| 9,751,689 | B2 * | 9/2017 | DiNovo ............... B65D 90/22 |
| 9,768,626 | B2 * | 9/2017 | Henman ............. H02J 7/0021 |
| 9,778,386 | B2 * | 10/2017 | Naes ................... G01V 1/18 |
| 9,829,589 | B2 | 11/2017 | Ray et al. |
| 9,846,250 | B2 * | 12/2017 | Rokkan ............... G01V 1/3852 |
| 9,873,496 | B2 * | 1/2018 | Rokkan ............... B63G 8/001 |
| 9,891,333 | B2 * | 2/2018 | Valsvik ............... G01V 1/3852 |
| 9,958,565 | B2 * | 5/2018 | Henman ............. G01V 1/3852 |
| 2005/0052951 | A1 * | 3/2005 | Ray .................... G01V 1/166 |
| | | | 367/188 |
| 2008/0080318 | A1 * | 4/2008 | Maxwell ............. G01V 1/16 |
| | | | 367/131 |
| 2008/0144442 | A1 | 6/2008 | Combee et al. |
| 2008/0225643 | A1 | 9/2008 | Vosburgh |
| 2009/0027999 | A1 | 1/2009 | Ray et al. |
| 2009/0068871 | A1 * | 3/2009 | Klassen ............. H01R 13/2471 |
| | | | 439/289 |
| 2009/0290453 | A1 * | 11/2009 | Ray .................... G01V 1/181 |
| | | | 367/188 |
| 2011/0051550 | A1 | 3/2011 | Lindberg |
| 2011/0266086 | A1 | 11/2011 | Welker et al. |
| 2012/0081994 | A1 | 4/2012 | Husom et al. |
| 2013/0058192 | A1 | 3/2013 | Gateman et al. |
| 2013/0163374 | A1 | 6/2013 | Herrmann |
| 2014/0126329 | A1 * | 5/2014 | Guyton ............... G01V 1/18 |
| | | | 367/76 |
| 2014/0198607 | A1 | 7/2014 | Etienne et al. |
| 2014/0211589 | A1 | 7/2014 | Maxwell |
| 2014/0290554 | A1 | 10/2014 | Brizard |
| 2015/0083234 | A1 * | 3/2015 | DiNovo ............... B65D 90/22 |
| | | | 137/206 |
| 2015/0136012 | A1 | 5/2015 | Williams |
| 2015/0331130 | A1 * | 11/2015 | Henman ............. G01V 1/3843 |
| | | | 405/158 |
| 2015/0362606 | A1 * | 12/2015 | Henman ............. B63B 21/66 |
| | | | 367/15 |
| 2016/0041280 | A1 | 2/2016 | Naes et al. |
| 2016/0041284 | A1 | 2/2016 | Rokkan et al. |
| 2016/0056645 | A1 * | 2/2016 | Henman ............. G01V 1/18 |
| | | | 320/112 |
| 2016/0062056 | A1 * | 3/2016 | Becker ............... G02B 6/3893 |
| | | | 439/282 |
| 2016/0349387 | A1 * | 12/2016 | Rokkan ............... G01V 1/166 |
| 2016/0377757 | A1 * | 12/2016 | Henman ............. G01V 1/3852 |
| | | | 405/158 |
| 2017/0017003 | A1 * | 1/2017 | Naes ................... G01V 1/18 |

FOREIGN PATENT DOCUMENTS

| | | | |
|---|---|---|---|
| WO | 2006041438 | A1 | 4/2006 |
| WO | 2011139159 | A1 | 11/2011 |
| WO | 2014027892 | A1 | 2/2014 |
| WO | 2014084741 | A1 | 6/2014 |

OTHER PUBLICATIONS

Cranford, A Direct-Recording Ocean-Bottom Seismograph, Bulletin of the Seismological Society of America, vol. 66, No. 2, 607-615 (Apr. 1976) ("Cranford").

Mattaboni, MITOBs: A Seismometer System for Ocean-Bottom Earthquake Studies, Marine Geophysical Researches 3 (1977), pp. 87-102 ("Mattaboni").

hittp://www.carrack.co.uk/minidobs.htm ("Carrack"), Carrack Measurement Technology, downloaded Jun. 20, 2017.

Willoughby, A Microprocessor-Based Ocean-Bottom Seismometer, Bulletin of the Seismological Society of America, vol. 83, No. 1., 190-217 (Feb. 1993) ("Willoughby").

Prothero, First Noise and Teleseismic Recordings on a New Ocean Bottom Seismometer Capsule, Bulletin of the Seismological Society of America, vol. 74, No. 3., 1043-1058 (Jun. 1984) ("Prothero").

Johnson, A Free-Fall Direct-Recording Ocean Bottom Seismograph, Marine Geophysical Researches 3 103-117 (1977) ("Johnson").

Sutton, Optimum Design of Ocean Bottom Seismometers, Marine Geophysical Researches 9 (1987), pp. 47-65 ("Sutton").

Schmalfeldt, Explosion-Generated Seismic Interface Waves in Shallow Water: Experimental Results, SACLANTCEN Report SR-71 (1983) ("Schmalfeldt").

Eguchi, A real-time observation network of ocean-bottom-seismometers deployed at the Sagami trough subduction zone, central Japan, Marine Geophysical Researches 20: 73-94, 1998 ("Eguchi").

Kirk, A Three-Component Ocean Bottom Seismograph for controlled Source and Earthquake Seismology, Marine Geophysical Researches 5, 1982, 327-341 ("Kirk").

Petition for Inter Partes Review of U.S. Pat. No. RE45,268, dated Apr. 27, 2018.

Petition for Inter Partes Review of U.S. Pat. No. 8,879,362, dated Apr. 27, 2018.

Petition for Inter Partes Review of U.S. Pat. No. 8,228,761, dated Apr. 27, 2018.

Wilcock, W.S.D. "The Deployment of a Long-Term Seafloor Seismic Network on the Juan de Fuca Ridge", Oceans 2007, IEEE, Piscataway, NJ USA, Sep. 29, 2007 (Sep. 29, 2007) pp. 1-6.

* cited by examiner

SEABED COUPLING PLATE FOR AN OCEAN BOTTOM SEISMIC NODE

PRIORITY

This application claims priority to U.S. provisional patent application No. 62/168,211, filed on May 29, 2015, the entire contents of which is incorporated herein by reference.

BACKGROUND OF THE INVENTION

Field of the Invention

This invention relates to marine seismic systems and more particularly relates to the design of seismic nodes deployed on the seabed, and more specifically to a coupling plate for such nodes.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded during a seismic survey. One such OBN system is offered by the Applicant under the name Trilobit®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel.

Autonomous ocean bottom nodes are independent seismometers, and in a typical application they are self-contained units comprising a housing, frame, skeleton, or shell that includes various internal components such as geophone and hydrophone sensors, a data recording unit, a reference clock for time synchronization, and a power source. The power sources are typically battery-powered, and in some instances the batteries are rechargeable. In operation, the nodes remain on the seafloor for an extended period of time. Once the data recorders are retrieved, the data is downloaded and batteries may be replaced or recharged in preparation of the next deployment. Various designs of ocean bottom autonomous nodes are well known in the art. Prior autonomous nodes include spherical shaped nodes, cylindrical shaped nodes, and disk shaped nodes. Other prior art systems include a deployment rope/cable with integral node casings or housings for receiving autonomous seismic nodes or data recorders. Some of these devices and related methods are described in more detail in the following patents, incorporated herein by reference: U.S. Pat. Nos. 6,024,344; 7,310,287; 7,675,821; 7,646,670; 7,883,292; 8,427,900; and 8,675,446.

Figure 1A:
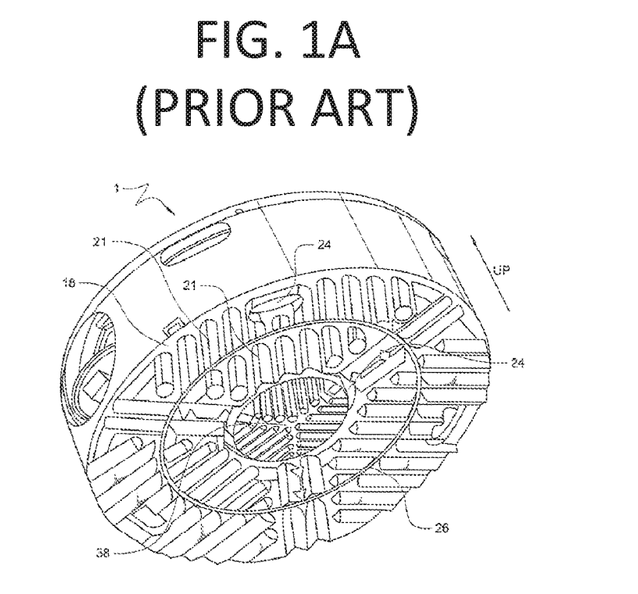
FIG. 1A illustrates a conventional base plate of a node as found in the prior art.
Figure 1B:
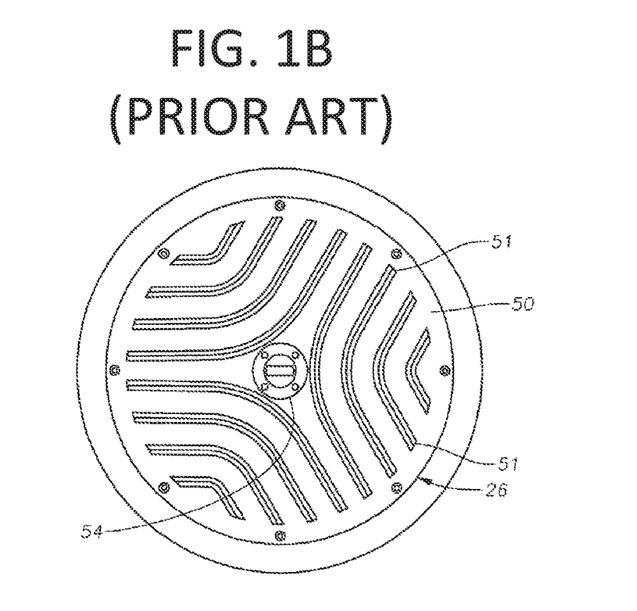
FIG. 1B illustrates a conventional base plate of a node as found in the prior art.

A conventional seismic node, whether placed on the seabed on its own with a navigation system, by an ROV, or by a cable, may include a base or lower plate that comprises radial grooves to help channel water during deployment and coupling to the seabed. For example, Applicant's Trilobit® node, described in U.S. Pat. No. 7,646,670, and incorporated herein by reference, illustrates a node with a conventional base plate. FIG. 2 from that patent is reproduced in the present application as FIG. 1A. The base plate may have grooves and/or holes on the underside of the plate to allow water and/or liquid mud to be expelled during deployment in water. Another node illustrating such radial designs is illustrated in U.S. Pat. No. 7,286,442, incorporated herein by reference. FIG. 4 from that patent is reproduced in the present application as FIG. 1B and shows ridges or grooves in the plate to enhance coupling to the ocean floor. Still another node illustrating such a grooved profile on the bottom plate is the KUM K/MT 210 seismometer, and similar to the other nodes discussed above, has radial grooves extending from the center of the plate.

The existing techniques for channeling water and/or liquid mud from the node as it couples to the seabed suffer from many disadvantages. With conventional plates, the seawater rushes out of the grooves at a high velocity from the center of the plate towards the circumference. As the gap distance between the bottom plate and the seabed approaches zero, the radial flow speed of exiting water may increase exponentially. If the node descent speed is sufficiently high, the radial flow may cause cavitation and temporary shear thinning of the seabed sediments, and thus, distort the effective acoustic coupling to the seabed.

A need exists for an improved node design for coupling to the seabed, and in particular one that allows for a more efficient and effective movement of water from the bottom of the node and/or the seabed coupling location.

SUMMARY OF THE INVENTION

Systems, methods, and apparatuses related to coupling an autonomous seismic node to the seabed. In one embodiment, the node may comprise a plurality of holes on a bottom surface of the node and a plurality of openings on one or more sides of the node. The node may be configured to route water vertically from the bottom holes through the side openings to decrease the potential of cavitation and fluidization of the seismic sediment and increase the seismic coupling of the node to the seabed.

In one embodiment, the autonomous seismic node comprises at least one seismic sensor, at least one data recording unit, and at least one clock, a body, and a coupling plate attached to the body is configured to make contact with the seabed. The coupling plate may comprise a first plurality of holes, each of which may be the approximate same size and may be chamfered. The square area of the first plurality of holes (e.g., the open-hole area) may be as low as approximately 5% of the square area of the coupling plate. In other embodiments, the square area of the holes may be at least 50% or 75% of the square area of the coupling plate. The node body may also comprise openings or holes located on one or more sides of the body or an upper surface that are fluidly coupled to the first plurality of holes on the coupling plate. The node may be configured to receive water into the first plurality of holes on the coupling plate and displace the received water into a second plurality of holes.

In some embodiments, a plurality of the electronic components of the node (such as the at least one seismic sensor, at least one data recording unit, and at least one clock) are located within a pressure chamber. Such a pressure chamber may be substantially surrounded by a non-pressure housing in which is located the openings and holes for water movement. Such a non-pressure housing or case may be in the approximate shape of a rectangle. The body may comprise an upper casing with an upper face and a plurality of sides, wherein the bottom plate is configured to couple to the upper casing to form a substantially enclosed container around a pressure chamber. The node may be deployed to the seabed in a variety of mechanisms, such as an ROV or AUV or deployment cable.

In another embodiment, the autonomous seismic node may comprise at least one seismic sensor, at least one data recording unit, and at least one clock, a body with a top surface and a bottom surface, wherein the bottom surface is configured to make contact with the seabed, a plurality of entry holes on the bottom surface of the body that are configured to receive water as the node makes contact with the seabed, and a plurality of exit holes on the body fluidly coupled to the plurality of entry holes and configured to pass water from the node. The plurality of exit holes may be located on a plurality of sides of the body or an upper surface of the body.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

The disclosed embodiment provides a novel solution to one or more of the industry's needs previously described herein and offers advantages over conventional base plates or coupling mechanisms on the bottom of seismic nodes. The disclosed embodiments include an apparatus that more effectively channels water as the node is coupling to the seabed and at the same time, helps compacting unconsolidated seabed under the coupling plate. In one embodiment, the apparatus is located at the bottom of the node and includes a plurality of chamfered holes configured for movement of water in a vertical direction from the seabed. In one embodiment, the chamfered holes are arranged in a pattern on the base plate of a node. The hole pattern or hole distribution may take many different forms, such as regular, concentric, or symmetric distributions around the vertical central axis of the node. In the prior art, base plates traditionally have grooves that channel the water in a radial direction. In the disclosed embodiment, the plurality of holes on the underside of the bottom plate is configured to allow water and/or liquid mud to flow at a lower, radial speed during the final landing stage. As the base plate is pushed into the mud, the liquids are squeezed vertically through the holes and then out to the sides, through the horizontal gaps, just above the base. The seabed sediment is partly compacted by the conical hole entrances and partly trapped inside the maze of channels inside the coupling plate. One of ordinary skill will recognize that the described embodiments may be expanded for use in a variety of seismic node applications when a better seabed to device coupling is desired, such as autonomous seismic nodes, seismic nodes deployed by an AUV or ROV, and even ocean bottom cables.

Autonomous Node Design

In one or more embodiments, the disclosed seabed coupling plate may be utilized in conjunction with any autonomous marine seismic node. Methods of deployment of such nodes from a marine vessel to the seabed is well known in the art. For example, Applicant's U.S. Patent Publication No. 2015/0362606, incorporated herein by reference, discloses one method of coupling nodes to a deployment cable and then deploying that cable to the seabed. Other methods are also well known in the art. Alternatively, a node may be deployed to the seabed without the use of a cable, such as by dropping the node from a marine vessel or deploying the node with an ROV. The disclosed seabed coupling plate is not necessarily limited to the method of deployment to or retrieval from the seismic node and the seabed.

Figure 2A:
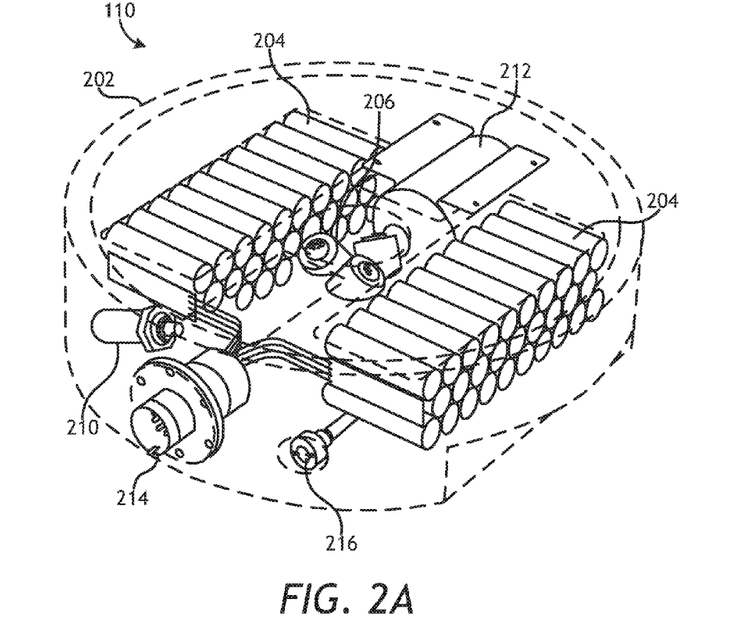
FIG. 2A illustrates a perspective view diagram of one embodiment of an autonomous seismic node.
Figure 2B:
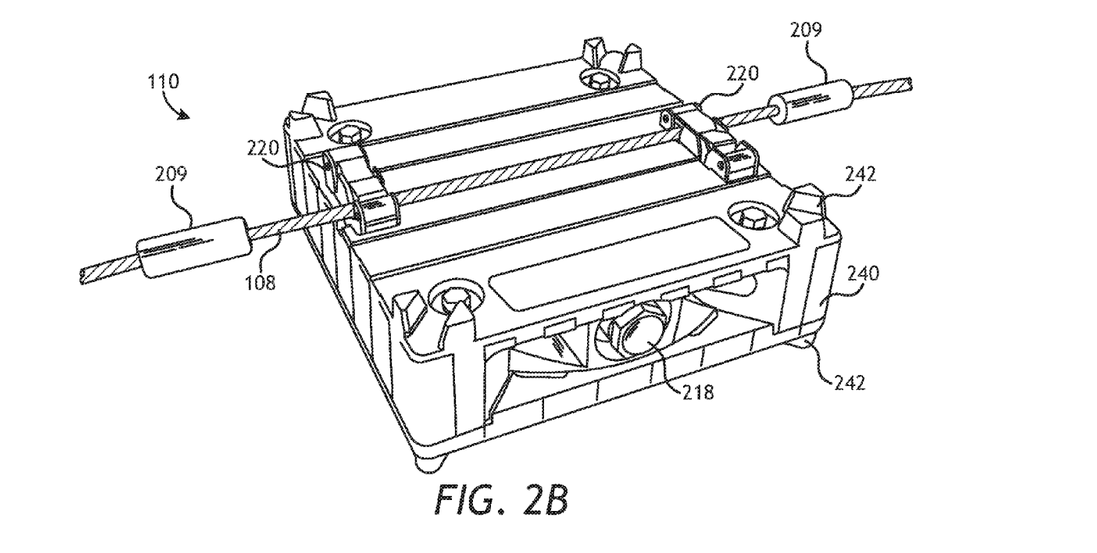
FIG. 2B illustrates a perspective view diagram of another embodiment of an autonomous seismic node.

FIGS. 2A and 2B illustrate various embodiments of an autonomous seismic node that may be utilized with the disclosed seabed coupling plate.

FIG. 2A illustrates a perspective view diagram of autonomous ocean bottom seismic node 110. Seismic node 110 may include body 202, such as a housing, frame, skeleton, or shell, which may be easily dissembled into various components. Additionally, seismic node 110 may include one or more power sources 204. Additionally, the seismic node may include pressure release valve 216 configured to release unwanted pressure from seismic node 110 at a pre-set level. The valve protects against fault conditions like water intrusion and outgassing from a battery package. Additionally, the seismic node may include electrical connector 214 configured to allow external access to information stored by internal electrical components, data communication, and/or power transfer. During the deployment the connector is covered by a pressure proof watertight cap 218 (shown in FIG. 2B). In other embodiments, the node does not have an external connector and data is transferred to and from the node wirelessly, such as via wireless electromagnetic or optical links. In other embodiments, there may be multiple connectors on the node, one for data transfer and one connector for power transfer.

In an embodiment, the internal electrical components may include one or more hydrophones 210, one or more (preferably three) geophones 206 or accelerometers, and a data recorder 212. In an embodiment, the data recorder 212 may be a digital autonomous recorder configured to store digital data generated by the sensors or data receivers, such as hydrophone 210 and the one or more geophones or accelerometers 206. One of ordinary skill will recognize that more or fewer components may be included in the seismic node 110. For example, there are a variety of sensors that can be incorporated into the node including and not exclusively, inclinometers, rotation sensors, translation sensors, heading sensors, and magnetometers. Except for the hydrophone, these components are preferably contained within the node housing that is resistant to temperatures and pressures and other seabed conditions (such as salinity) at the bottom of the ocean, as is well known in the art. In an embodiment, the seismic node includes one or more components configured for wireless transmission of data to and from the node via electromagnetic or optical components. Data can be retrieved from the node during deployment or, more preferably, from the node while the node is in a workstation or container on board the marine vessel.

While the node in FIG. 2A is circular in shape, the node can be any variety of geometric configurations, including square, rectangular, hexagonal, octagonal, cylindrical, and spherical, among other designs, and may or may not be symmetrical about its central axis. In one embodiment, the node consists of a watertight, sealed case or pressure housing that contains all of the node's internal components. In another embodiment, the pressure housing is partially and/or substantially surrounded by a non-pressure housing that provides the exterior shape, dimensions, and boundaries of the node. In one embodiment, the node is square or substantially square shaped so as to be substantially a quadrilateral, as shown in FIG. 2B. One of skill in the art will recognize that such a node is not a two-dimensional object, but includes a height, and in one embodiment may be considered a box, cube, elongated cube, or cuboid. While the node may be geometrically symmetrical about its central axis, symmetry is not a requirement. Further, the individual components of the node may not be symmetrical, but the combination of the various components (such as the pressurized housing and the non-pressurized housing) provide an overall mass and buoyancy symmetry to the node. In one embodiment, the node is approximately 350 mm×350 mm wide/deep with a height of approximately 150 mm. In one embodiment, the body 202 of the node has a height of approximately 100 mm and other coupling features, such as node locks 220 or protrusions 242, may provide an additional 20-50 mm or more height to the node.

In another embodiment, as shown in FIG. 2B, the node's pressure housing may be coupled to and/or substantially surrounded by an external envelope or housing 240. Various portions of non-pressure housing 240 may be open and expose the pressure housing as needed, such as for hydrophone 210, node locks 220, and data/power transfer connection 214 (shown with a fitted pressure cap 218 in FIG. 2B). In one embodiment, the upper and lower portions of the housing include a plurality of gripping teeth or protrusions 242 for engaging the seabed and for general storage and handling needs. Non-pressure node housing 240 provides many functions, such as protecting the node from shocks and rough treatment, coupling the node to the seabed for better readings (such as low distortion and/or high fidelity readings) and stability on the seabed, and assisting in the stackability, storing, alignment, and handling of the nodes. Each external housing may be made of a durable material such as rubber, plastic, carbon fiber, or metal, and in one embodiment may be made of polyurethane or polyethylene. In still other embodiments, the seismic node 110 may include a protective shell or bumper configured to protect the body in addition to or in lieu of external housing 240.

In one embodiment, seismic node 110 comprises one or more direct attachment mechanisms and/or node locks 220, as described in more detail in U.S. Patent Publication No. 2015/0362606, incorporated herein by reference, that may be configured to directly attach the seismic node 110 to a deployment line 108. The node locks (and attached nodes) may be coupled to and decoupled from the deployment line via a node deployment system, as described in more detail in U.S. Patent Publication No. 2016/0041284, incorporated herein by reference. Of course, the node of the disclosed embodiment need not be directly or indirectly coupled to a deployment cable, and may be placed individually on the seabed without use of a deployment cable.

Those skilled in the art would appreciate that more or less modules or components may be added to or removed from the node based on the particular needs of the node.

Autonomous Underwater Vehicle

In one or more embodiments, the disclosed seabed coupling plate may be utilized in conjunction with an autonomous underwater vehicle (AUV), such as that described in Applicant's U.S. Pat. No. 9,090,319, incorporated herein by reference. In one embodiment, the AUV may be a seismic AUV, such that the autonomous seismic node is incorporated into the autonomous underwater vehicle. Methods of deployment of such AUVs (and of their configurations) to the seabed is well known in the art. Again, the disclosed seabed coupling plate is not necessarily limited to the method of deployment to or retrieval from the seismic node and the seabed.

An AUV in the following description is considered to encompass an autonomous self-propelled underwater node that has one or more sensors capable of detecting seismic waves in a marine environment. In one embodiment, an AUV has a body to which a propulsion system is attached, such as one or more propellers. Other propulsion systems may be used, e.g., jets, thrusters, pumps, etc. Alternatively, the propulsion system may include adjustable wings for controlling a trajectory of the AUV. The propulsion system may be controlled by a processor/controller. The processor may also be connected to a seismic sensor. In some embodiments, a seismic sensor unit may be located entirely within the body of the AUV, and in other embodiments some or all of the seismic sensor unit may protrude from or be located outside of the AUV body. An AUV may use active or passive coupling to the seabed to create a good coupling to the seabed. A memory unit may be connected to the processor and/or seismic sensor for storing a seismic sensor's recorded data. A battery may be used to power all these components.

The AUV may also include an inertial navigation system (INS) configured to guide the AUV to a desired location. Besides or instead of INS, the AUV may include a compass and other sensors such as, for example, an altimeter for measuring its altitude, a pressure gauge, an interrogator module, etc. The AUV may optionally include an obstacle avoidance system and a communication device (e.g., Wi-Fi device, a device that uses an acoustic link) or another data transfer device capable of wirelessly transferring data. One or more of these elements may be linked to processor. The AUV further includes an antenna (which may be flush with the body of the AUV) and a corresponding acoustic system for subsea communications, such as communicating with the deploying, shooting, or recovery vessel (or other surface vessel) or an underwater base/station or another AUV or ROV. For surface communications (e.g., while the AUV is on a ship), one or more of antenna and communication device may be used to transfer data to and from the AUV. Stabilizing fins and/or wings for guiding the AUV to the desired position may be used together with propeller for steering the AUV. However, in one embodiment, the AUV has no fins or wings. The AUV may include a buoyancy system for controlling the AUV's depth and keeping the AUV steady after landing.

Those skilled in the art would appreciate that more or less modules or components may be added to or removed from the AUV based on the particular needs of the AUV.

Coupling Plate

As mentioned above, the disclosed seabed coupling plate can interface with a variety of seabed sensors and/or nodes. In one embodiment, the seabed plate may be part of or coupled to a coupling case that encloses a pressure chamber or housing that encloses most or all of the electronic components of the node. Such a coupling case is more fully disclosed in Applicant's U.S. Patent Publication No. 2016/0041280, incorporated herein by reference.

Figure 3:
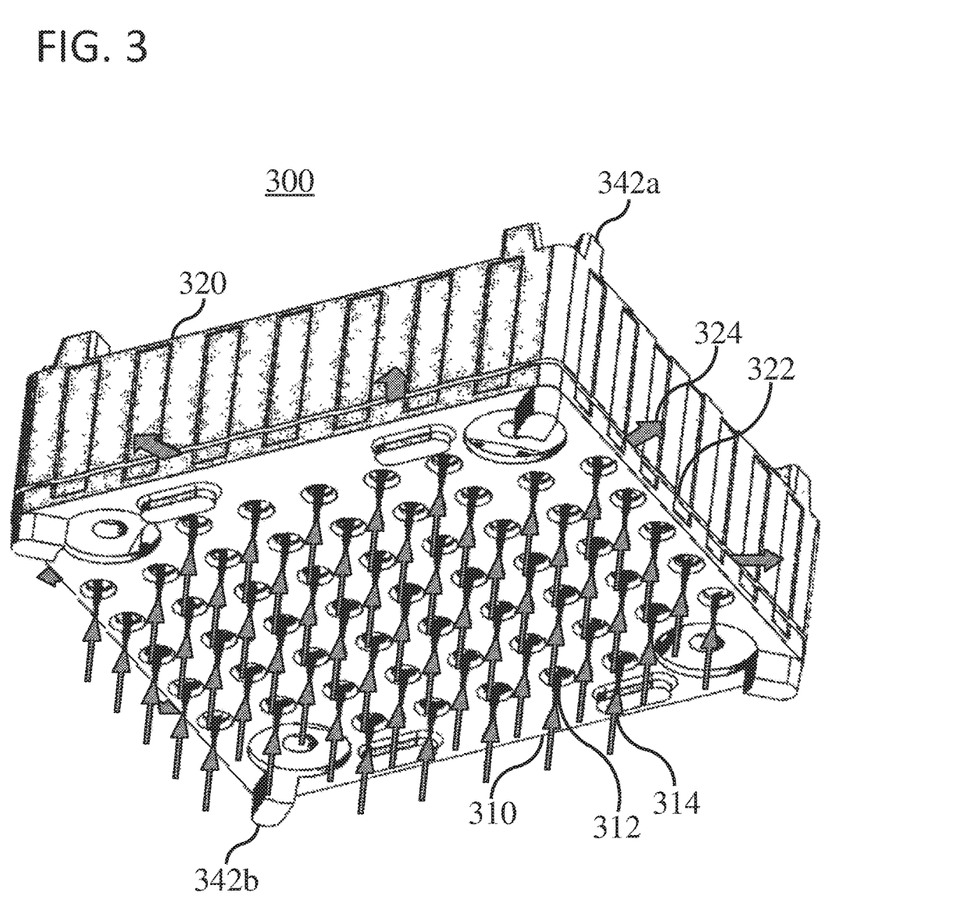
FIG. 3 is a perspective view diagram illustrating one embodiment of a node coupling case with a bottom plate.

FIG. 3 shows one embodiment of a perspective view of node coupling case 300. In one embodiment, the node coupling case is square or rectangular and substantially encloses node 110 or a pressure housing of the node. In one embodiment, the node and/or node housing may be any shape, whether square, disc, spherical, or cylindrical shaped, but is substantially enclosed or encapsulated by a coupling case that may be square or rectangular. In one embodiment, it is planar and symmetrical. The node coupling case 300 may comprise a bolted shell, made from two molded plastic parts, and in one embodiment is in the form of a clamshell from the vertical perspective. In one embodiment, the coupling case comprises a first part and a second part, which may be fastened together by bolts and/or otherwise secured around the pressure housing of the node. Various portions of coupling case 300 may be open and expose the pressure housing as needed, such as for the hydrophone, node locks, and data/power transfer connection. In one embodiment, the upper and lower portions of the housing include a plurality of gripping teeth or protrusions for engaging the seabed and for general storage and handling needs.

As shown in FIG. 3, node coupling case 300 may comprise bottom plate 310 coupled to upper case 320. Upper case 320 may be in the form of an open box configuration, such that upper case 320 surrounds node and bottom plate 310 keeps the node within case 300. Bottom plate 310 may be the lower surface/face of coupling case 300, while in other embodiments bottom plate 310 may be a separate piece that mates to the remaining portion of the coupling case, which in one embodiment may be an open box configuration. While bottom plate 310 may have a variety of configurations and cross-sections, in one embodiment, it is substantially rectangular in shape and may be in the form of a square. In other embodiments, it may be elliptical or circular in shape. Bottom plate 310 is configured to couple with and/or contact the seabed with the node at the bottom of the ocean. Bottom plate 310 may include a plurality of gripping teeth or protrusions 342*b* for engaging a firm seabed and for general storage (stacking) and handling needs outside of the seabed context. In one embodiment, bottom protrusions 342*b* may couple, engage, and/or mate with top protrusions 342*a* for stacking. Bottom plate 310 may have a plurality of holes or openings 312 that are configured for water and/or liquid mud movement through the holes. In one embodiment, each of holes 312 is chamfered and configured to achieve a good coupling of the node to soft seabeds. The holes may form a patterned shape on the plate, such as a grid pattern or other arrangements or distributions to maximize water flow through the case. In one embodiment, plurality of holes 312 is configured to allow vertical, low-speed movement of water through node casing 300 as the node approaches the seabed. The flow of water may enter into each of holes 312 as shown by the directional arrows 314 in FIG. 3. Thus, holes 312 may be considered entry holes for the water through case 300. Holes 312 on the bottom plate may also be configured to better grip with the seabed (for seismic coupling purposes) and compact the sediment on the seabed. The bottom plate also may have protruding and/or recessed pattern features that may help seabed compaction.

Node casing 300 may also have one or more horizontal openings or slots 322 on one or more sides of node casing 300 to allow radial/horizontal movement of water through the casing. The flow of water may enter into each of holes, slots, or openings 322 as shown by the directional arrows 324 in FIG. 3. Thus, holes 322 may be considered exit holes for water passing through case 300. Openings 322 may be substantially horizontal (such as a slot) or may simply be one or more holes on the sides of case 320. In some embodiments, the one or more horizontal holes and/or openings 322 may be located on one or more sides of upper casing 320. In still other embodiments, the one or more horizontal openings may be formed in the interface between bottom plate 310 and upper case 320. In one embodiment, the size of holes 322 may be adjusted based on how the bottom plate is attached or fastened to the upper casing, such as the use of spacers between the two components or different screws/fasteners.

In one embodiment, each of the plurality of holes 312 is substantially the same size, while in other embodiments, each of the plurality of holes 312 may comprise a plurality of different sizes. The hole size, number, and distribution may be based on a variety of factors, including seabed sediment grain size, descent speed, and node design/production constraints. In some configurations, the total area of the plurality of entry holes 312 may be between approximately 5-75% of the area of the bottom plate. In one embodiment, holes 312 on the bottom plate may be considered vertical holes (e.g., water travels vertically through holes 312 as the node approaches the seabed) and openings 322 may be considered horizontal openings (e.g., water travels substantially horizontally through holes 314 as the node approaches the seabed). Holes 312 and holes 322 are fluidly coupled within the case, such that water that flows into holes 312 exits holes 322. The node coupling case may also have openings on a top surface allowing water to move vertically and horizontally through the node, as discussed more in relation to FIG. 4. In one embodiment, the total area of the plurality of holes 312 may be less than the total area of the openings 322, and in other embodiments, the total area of the horizontal openings 322 may be less than the total area of the plurality of holes 312.

Figure 4:
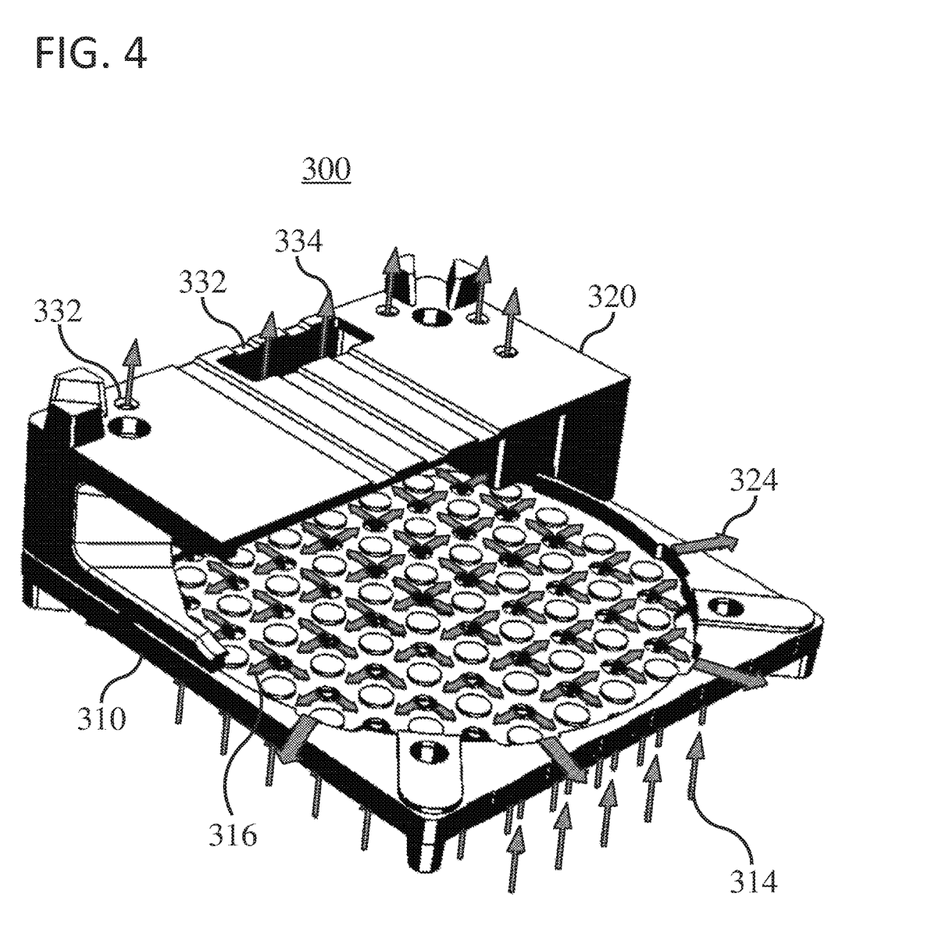
FIG. 4 is a perspective view diagram illustrating another embodiment of a node coupling case with a bottom plate.

FIG. 4 shows one embodiment of a perspective view of node coupling case 300 with a portion of the case removed, and in particular a portion of upper case 320 removed. In one embodiment, the plurality of horizontal openings 322 on the sides of coupling case 300 are fluidly connected and/or coupled to the plurality of holes 312 on bottom plate 310. In one embodiment, fluid that flows into one or more of the plurality of holes 312 is configured to flow out of one or more of the plurality of horizontal openings 322. The plurality of holes 312 and/or openings 322 may be arranged such that fluid flows substantially vertically through the plurality of holes on the bottom plate (as shown by directional arrows 314) and substantially radially through the plurality of horizontal openings on the side of the node coupling case 300 (as shown by directional arrows 324). In other embodiments, coupling case 300 and/or bottom plate 310 is configured to allow water and liquid mud to flow substantially vertically into a compartment of node coupling case 300 rather than radially outwards as in conventional nodes with a bottom-grooved surface. In still other embodiments, the configuration of coupling plate 310 allows any sediment, debris, and/or mud to compact inside one or more of the plurality of holes on the bottom plate while allowing the water to flow vertically through coupling plate 310 and out through the side or top walls of upper case 320. In one embodiment, as water flows through holes 312 it may radiate outward in a plurality of radial directions (e.g., to one or more sides of node casing 300), as shown by directional arrows 316.

In still other embodiments, rather than or in addition to having a plurality of horizontal openings, the node coupling case may have a second plurality of vertical openings 332 on the upper or top portion of the case 320, as show in FIG. 4. In this embodiment, a first plurality of vertical holes 312 on bottom plate 310 allows the entry of water as the node descends to the seabed, and the second plurality of vertical holes 332 is in fluid connection with the first plurality of holes 312 and is arranged to channel or release the introduced water as the node descends to the seabed. In one embodiment, the second plurality of vertical openings 332 comprises an opening on a plurality of the upper corners of the node coupling case. In still other embodiments, the second plurality of vertical openings 332 is coupled to or adjacent to a plurality of node locks and/or node lock openings on the upper portion of node coupling case 300. In some embodiments, holes 332 on the upper face or portion of case 320 may be used in addition to or in lieu of holes 322 on the sides of upper case 320. Thus, the node coupling case may be configured to allow water exit from the bottom plate through the coupling case through both side openings 322 (in a horizontal flow) and holes 332 (in a vertical flow). The flow of water may exit holes 332 as shown by directional arrows 334 in FIG. 4.

In another embodiment, a sediment filter (not shown) may be utilized that fits between bottom plate 310 and upper casing 320. The filter may be configured to pass water and block or limit sand, debris, and other sediment. The filter may be configured to keep sediment and debris from collecting within the node casing 300 and/or specific components of the node that may be coupled to the water, such as a hydrophone or transponder. In one embodiment it may be in the shape of a circle, square, or rectangular, and may be a simple off-the-shelf filter. This filter may be replaced and/or cleaned when the node is examined on the marine vessel before or after deployment to the seabed.

While the embodiments described above relate to a bottom plate of a node coupling case, the plurality of openings configured for vertical water displacement may be located on the bottom surface or side of the node itself, and in other embodiments, the bottom surface or side of an AUV. In these embodiments, the bottom plate may be directly attached to the node or AUV itself. In still other embodiments, the plurality of vertical openings may be integrated into the node/AUV body and/or housing itself. Because an AUV has a propulsion system, in some embodiments, the AUV is configured to cut into or engage a portion of the AUV and/or bottom plate into the soft sediments on the seabed. In other embodiments, the AUV propulsion system is configured to engage the bottom plate a distance further into the seabed sediments than an AUV or bottom plate that merely rests on the seabed. In some embodiments, the AUV is arranged to pump water through the plurality of openings on the bottom plate to further remove sediments on the seabed as the node descends and/or lands on the seabed.

Many other variations in the configurations of the seismic node and/or coupling plate are possible within the scope of the invention. For example, the node may be circular or rectangular shaped. The node may or may not be part of an AUV or an ocean bottom cable. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. An ocean bottom seismic node, comprising:
   a body;
   at least one seismic sensor, at least one data recording unit, and at least one clock located in the body;
   a seabed coupling plate attached to a bottom portion of the body and comprising a first plurality of holes within a first surface of the coupling plate, wherein the first surface of the seabed coupling plate is configured to make contact with the seabed,
   wherein the first plurality of holes is arranged in a grid pattern over a substantial portion of the first surface,
   wherein the body comprises a plurality of exit openings that are fluidly coupled to the first plurality of holes on the seabed coupling plate,
   wherein the body is configured for vertical movement of water through the first plurality of holes on the seabed coupling plate and out of the body through the plurality of exit openings.

2. The seismic node of claim 1, wherein each of the first plurality of holes is chamfered.

3. The seismic node of claim 1, wherein the square area of the first plurality of holes is at least 5% of the square area of the coupling plate.

4. The seismic node of claim 1, wherein the plurality of exit openings is located on one or more sides of the body.

5. The seismic node of claim 1, wherein the plurality of exit openings is located on an upper surface of the body.

6. The seismic node of claim 1, wherein the first plurality of holes is arranged for vertical movement of water beneath the coupling plate.

7. The seismic node of claim 1, wherein the body comprises a pressure housing that is substantially surrounded by a non-pressure housing, wherein the coupling plate is attached to the non-pressure housing.

8. The seismic node of claim 1, wherein the node is configured to be deployed to the seabed by a deployment cable from a marine vessel.

9. The seismic node of claim 1, wherein the node is configured to be deployed to the seabed by a remotely operated vehicle (ROV).

10. The seismic node of claim 1, wherein the node is coupled to an autonomous underwater vehicle (AUV).

11. The seismic node of claim 1, wherein the node is an autonomous underwater vehicle (AUV).

12. The seismic node of claim 1, wherein the body comprises an upper casing with an upper face and a plurality of sides, wherein the bottom seabed coupling plate is configured to couple to the upper casing to form a substantially enclosed container.

13. The seismic node of claim 1, further comprising a sediment filter coupled to the coupling plate.

14. The seismic node of claim 1, wherein the node is configured for horizontal movement of water and vertical movement of water through one or more compartments of the body as the water flows between the first plurality of holes and the plurality of exit openings.

15. The seismic node of claim 1, wherein the node comprises one or more compartments that is in fluid connection between the first plurality of holes and the plurality of exit openings.

16. An ocean bottom seismic node, comprising:
    at least one seismic sensor, at least one data recording unit, and at least one clock;
    a body with a top surface and a bottom surface, wherein the bottom surface is configured to make contact with the seabed;
    a plurality of entry holes on the bottom surface of the body that are configured to receive water as the bottom surface makes contact with the seabed;
    a plurality of exit holes on the body fluidly coupled to the plurality of entry holes by one or more compartments within the node, wherein the plurality of exist holes is configured to pass water from the node,
    wherein the plurality of entry holes is arranged in a grid pattern over a substantial portion of the bottom surface of the body;
    wherein the body is configured for vertical movement of water through the plurality of entry holes on the bottom surface of the body and out of the body through the plurality of exit openings through the one or more compartments.

17. The seismic node of claim 16, wherein the plurality of exit holes are located on a plurality of sides of the body and on the top surface of the body.

* * * * *